No. 751,086. PATENTED FEB. 2, 1904.
J. LYNN.
ADVERTISING WHEEL.
APPLICATION FILED OCT. 31, 1902.
NO MODEL. 2 SHEETS—SHEET 1.

WITNESSES:

INVENTOR
John Lynn
BY
Alfred Hedlock.
ATTORNEY

No. 751,086. PATENTED FEB. 2, 1904.
J. LYNN.
ADVERTISING WHEEL.
APPLICATION FILED OCT. 31, 1902.
NO MODEL. 2 SHEETS—SHEET 2.
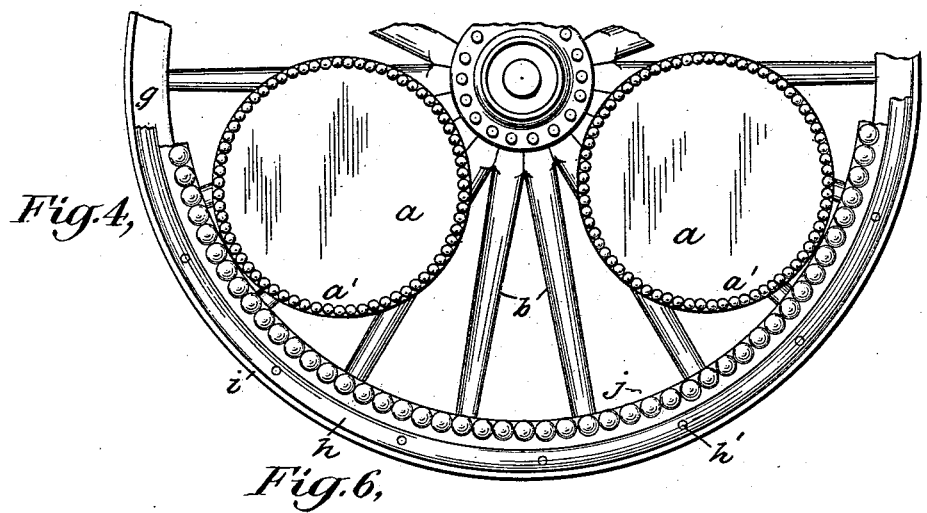
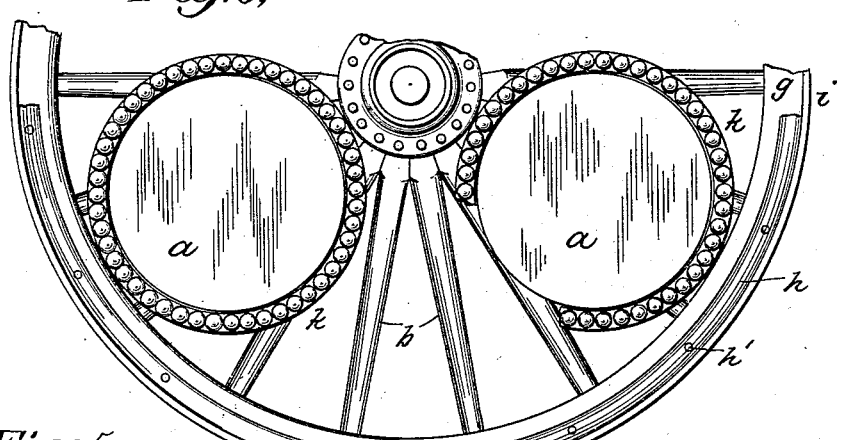
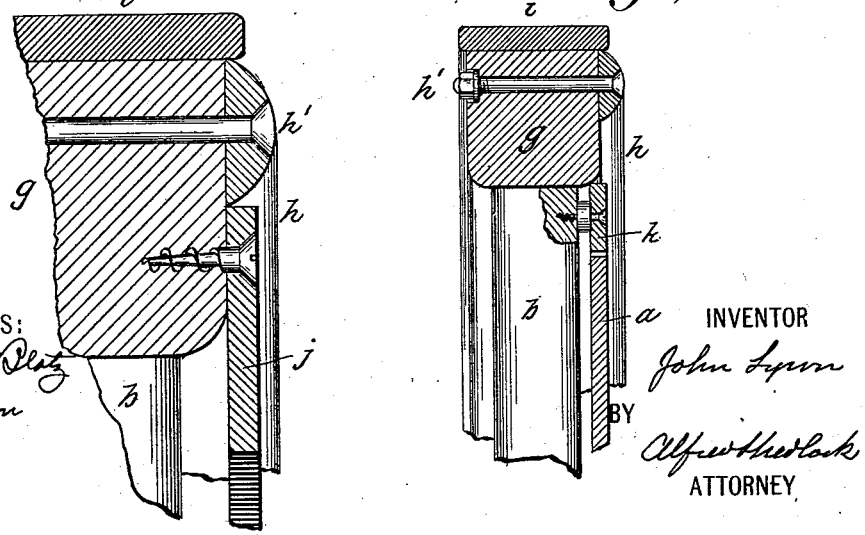
WITNESSES:
INVENTOR
John Lynn
BY
Alfred Hedlock
ATTORNEY No. 751,086. Patented February 2, 1904.

UNITED STATES PATENT OFFICE.

JOHN LYNN, OF NEW YORK, N. Y.

ADVERTISING-WHEEL.

SPECIFICATION forming part of Letters Patent No. 751,086, dated February 2, 1904.

Application filed October 31, 1902. Serial No. 129,537. (No model.)

*To all whom it may concern:*

Be it known that I, JOHN LYNN, a citizen of the United States, and a resident of New York, county and State of New York, have invented Improvements in Advertising-Wheels, of which the following is a specification.

The improved advertising device forming the subject of this invention comprises plates or disks arranged within the rims or fellies and at one side of the spokes of vehicle-wheels or other wheels of ordinary construction adapted to rotate on fixed axles, said plates or disks being so constructed and applied to the wheels and controlled that all advertising or display matter on their surfaces will be constantly maintained in correct readable position, and annular series of representations of certain subjects, preferably balls, located around the display-disks and secured to the wheels in such manner that as the wheels rotate or roll over the ground the balls, &c., will by illusive effects have the appearance of rotating on their individual axes and in applying to vehicle-wheels laterally-projecting ribs or flanges arranged on the sides of the fellies so as to project sidewise beyond the tires of the wheels, thus providing means for the protection of the display-advertising devices from abrasion or injury by contacting with the curbs of sidewalks and other objects.

Details of construction and arrangement of parts will now be fully described, reference being had to the accompanying drawings.

Figure 1:
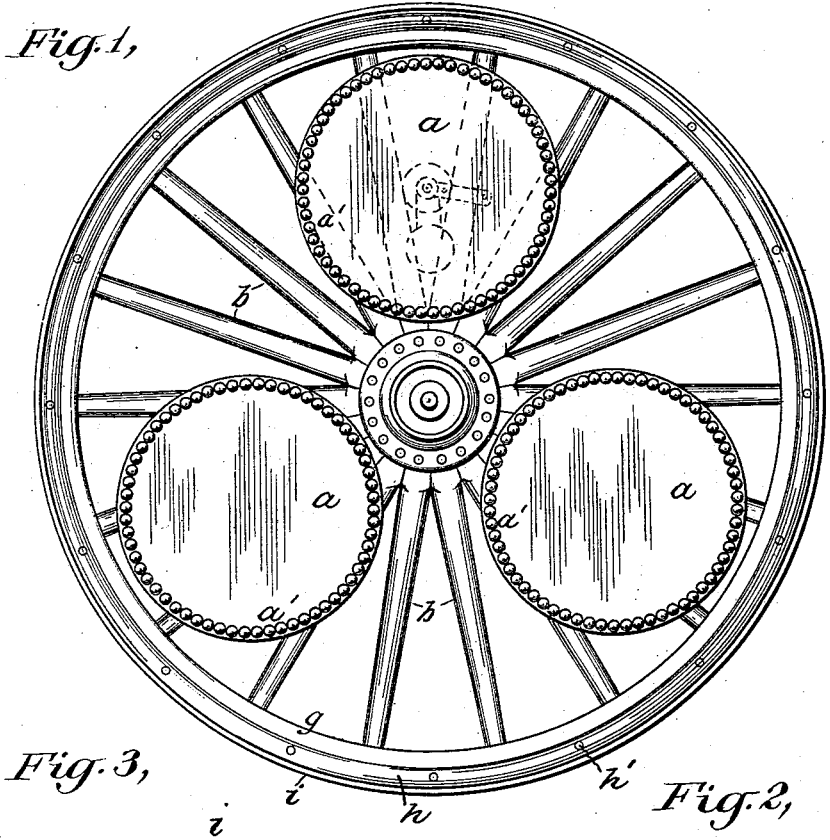
Figure 3:
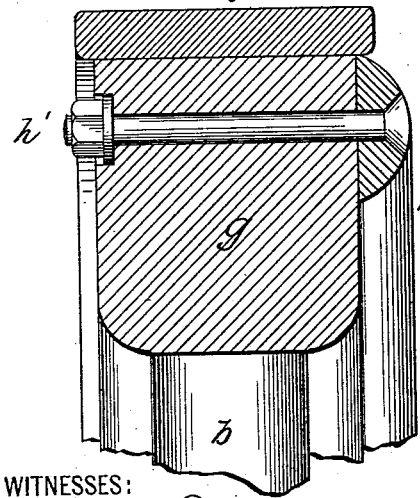
Figure 2:
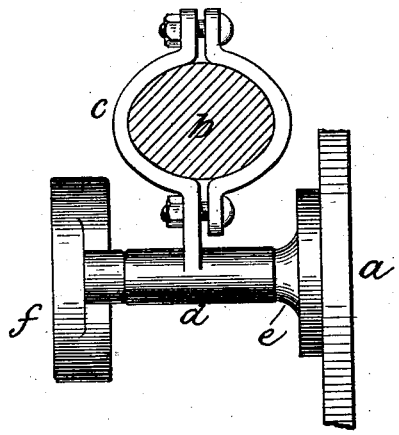

Figure 1 represents a vehicle-wheel provided with three non-rotating advertising-disks arranged between the fellies and the hub and a protecting bead or flange on the side of the felly. Fig. 2 is a part section of one of the disks and of the spoke of the wheel to which it is attached, showing the bearing-clamp for holding the disk on the spoke and the counterweight for holding the disk from rotating. Fig. 3 is a transverse section of the rim of the wheel and protecting bead or flange. Fig. 4 represents part of a wheel with non-rotating advertising-disks, as in Fig. 1, and an annular plate or flat ring provided with representations of balls and secured to the wheel on the side of the felly. Fig. 5 is a transverse section of part of Fig. 4. Fig. 6 represents part of a wheel with non-rotating disks carried by the spokes and annular plate or flat rings ornamented with representions of balls inclosing said disks and secured rigidly to the spokes. Fig. 7 is a transverse section of part of Fig. 6.

In the drawings my improved advertising system is shown applied to ordinary vehicle-wheels. This is the principal contemplated application; but it will be seen from the following description of the invention that it is adapted to be used in conjuction with any wheel fitted to rotate on a fixed axle.

In Figs. 1 and 2 the means shown for preventing the rotation of the three display-disks $a\ a$ and attaching them to the spokes $b\ b$ of the wheel consists of clamps $c\ c$, held on the spokes by their parts being drawn together by bolts and nuts and provided with bearings $d\ d$, arranged parallel to the axle of the wheel. Short shafts $e\ e$, secured at their ends to the central parts of the disks, pass through and are fitted to rotate in the bearings $d\ d$, and to the inner ends of these shafts are secured pendent counterweights $f\ f$, the functions of which are to prevent the disks rotating as they are carried around in the wheel. These disks $a\ a$ are located as far as possible within a plane embracing the outer side of the felly $g$ of the wheel, and to insure them from injury by coming in contact with the curbs of sidewalks and other objects I apply to the outer side of the felly a bead or ring of metal $h$, of any desired suitable cross-section, secured thereto by bolts and nuts $h'$, and preferably located just within the tire $i$ of the wheel. This bead or ring $h$ also strengthens the felly and protects it and the tire $i$ from abrasion.

Fig. 3 shows, on an enlarged scale, the manner in which the protecting-bead may be secured to the felly.

Where it is desired to make use of an annular series of ball representations secured rigidly to the wheel, so as to revolve therewith, the plan may be adopted which consists of a large flat ring $j$, secured by screws to the felly $g$ just inside of the bead $h$ and provided with a series of balls, which when said ring rotates with the wheel have the illusive effect of self-rotation. The wheel in this view is also shown as provided with the protecting-bead $h$, which, with the ornamented ring $j$, is clearly shown in the enlarged sectional view Fig. 5. The disks $a\ a$ in both Figs. 1 and 4 are shown impressed or otherwise ornamented with balls $a'\ a'$ on their surfaces.

At Figs. 6 and 7 a wheel is shown provided with a series of display advertising-disks in all essential features similar to the drawings previously described, but with flat rings $k\ k$, surrounding each of the disks, ornamented similarly to the large flat ring $j$, and secured to the spokes $b\ b$, each of said rings being caused to rotate around the disk $a$, which it surrounds, when the wheel revolves or rolls over the ground. The sectional view Fig. 7 illustrates how the ornamented rings may be secured to the spokes of the wheels by screws. Such an arrangement may, if desired, be used in conjunction with a large flat ring, as shown at $j$. These advertising and display disks applied to vehicle-wheels may, if desired, be controlled positively by gearing similar to the analogous construction shown in my beforementioned application. Any suitable number of such disks may of course be applied to wheels.

While the advertising-disks are here shown as circular, the application of the invention is not restricted to such form. They may be of any polygonal form.

What I claim is—

1. In an advertising device, in combination, a rotatable wheel; display-disks carried in bearings located within the felly of the wheel; means for preventing the disks rotating as they are carried around by the wheel; and series of representations of devices, as balls, rigidly secured to the wheel and surrounding the display-disks.

2. In an advertising device, the combination with a rotatable wheel of a display-disk carried around with the wheel, provided with means for causing said disk to turn in its bearings so that no actual rotation of the disk occurs as it is carried around with the wheel, and having an annular series of representations of balls around its periphery.

3. The combination with a vehicle-wheel, and display advertising devices attached to the wheel and located within the side plane of its felly; of a protecting bead or ring secured to and projecting from the side of the felly.

4. In an advertising device, the combination with a rotatable wheel of a display-disk carried around with the wheel, provided with means for causing said disk to turn in its bearings so that no actual rotation of the disk occurs as it is carried around with the wheel, and having an annular series of representations of balls around its periphery, and a bead or ring secured to and projecting from the side of the felly.

5. In an advertising device, in combination, a rotatable wheel; display-disks carried in bearings located within the felly of the wheel; means for causing said disks to turn in their bearings so that no actual rotation of the disks occurs as they are carried around by the wheel; and series of representations of devices, as balls, rigidly secured to the wheel and surrounding each of the display-disks, and a bead or ring secured to and projecting from the side of the felly.

In testimony whereof I have hereunto subscribed my name this 30th day of October, 1902.

JOHN LYNN.

Witnesses:
ARTHUR C. BLATZ,
M. NIXON.